Aug. 19, 1941.    R. L. GHEEN    2,253,232
PIPE COUPLER LATCH
Filed Feb. 17, 1940
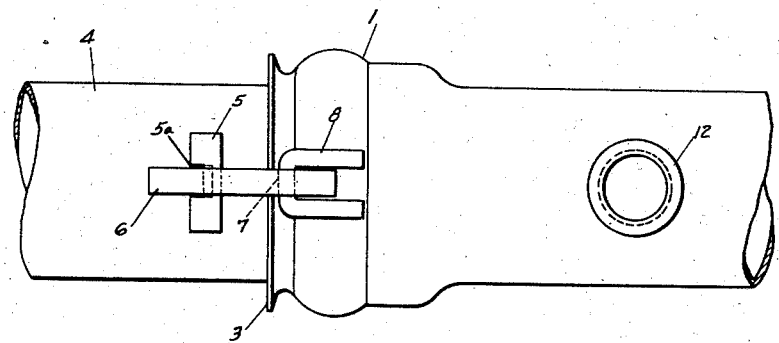
Fig. I
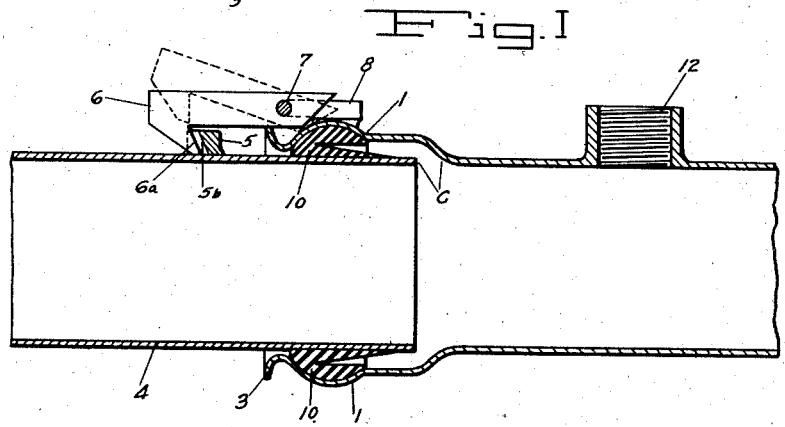
Fig. II
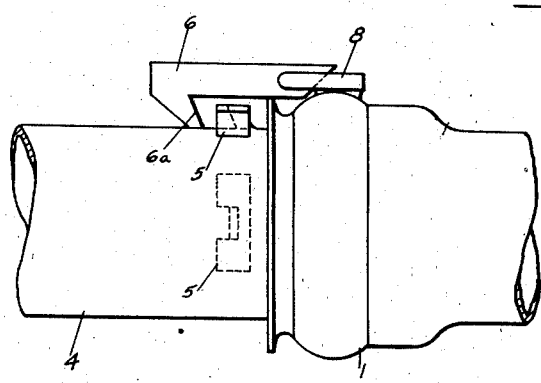
Fig. III
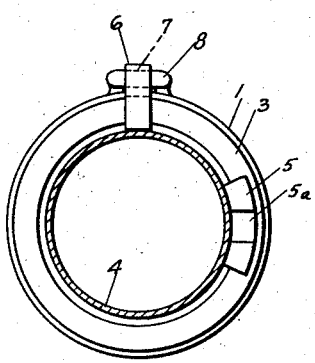
Fig. IV
INVENTOR
ROBERT L. GHEEN
BY *G. F. McDougall*
ATTORNEY Patented Aug. 19, 1941

2,253,232

UNITED STATES PATENT OFFICE 2,253,232

PIPE COUPLER LATCH

Robert L. Gheen, Eugene, Oreg.

Application February 17, 1940, Serial No. 319,497

3 Claims. (Cl. 285—172)

This invention relates to a latching device for what is known in the art as a "quick coupling".

During the last few years it has been appreciated that by far the most effective use of water for irrigation purposes is that use that most closely approximates natural rain, viz. surface sprinkling.

To accomplish this in the best way now known, light steel pipes are connected to a source of water under pressure, usually a pump, and the pipes are laid on the surface of the ground, water is forced through the pipes and delivered through sprinkler heads of various sorts, being left in situ only a short time and then moved to cover other areas.

These pipes must in most cases be handled, that is laid, coupled and uncoupled by one man, else the cost of handling runs up to a point where it is uneconomical; hence the "quick" or self-sealing coupling, which can be coupled by one man who holds the pipe by its median portion. The necessity of a latching device is at once seen because a pipe that can be inserted easily will blow apart under pressure, just as easily.

Latching devices are broadly old and many different varieties have been used, practically all of which require that a pin of some sort be used, somewhat like a clevis pin; because if the pipe is not laid perfectly straight it tends to twist, disengaging the latch when the pressure is applied. Two on the same joint is too cumbersome to handle.

An object of the present invention is a latch that can as readily be engaged and disengaged from a distance, such as from the middle of a 16 or 20 foot length of pipe, yet will lock as firmly against not only the blow-apart forces, but the twisting force as well.

Another object is a latch that is fully as resistant to the forces encountered in a pipe line under pressure as the pin and clevis type but which saves the time of the user materially when performing the laying and moving acts that are so often necessary to repeat in moving the pipe.

I do not claim the latch broadly nor the self-engaging latch, but only the latch defined in the claims appended hereto, in combination with the keeper substantially as hereinafter described and illustrated and as defined in the claims.

A drawing showing the best form of the latch and its application, forms a part hereof, in which—

Fig. I is a top view of a pipe inserted into a quick coupler of standard well known type, with my new latch applied to hold the pipe and coupler together as indicated. The actual engaging surfaces are slightly separated for clarity of the drawing;

Fig. II is a section of Fig. I on the centerline;

Fig. III is a side view of a portion of Fig. I, but showing the two parts, pipe and coupler inserted ready to latch by a pull on either member but as yet unlatched; and Fig. IV is an end view of Fig. III in orthographic projection.

In the drawing, 1 is a quick coupler consisting as usual of a belled portion formed on the end of a light weight steel pipe, the bell being of such inner form that a rubber pressure seal 10 may be held in place within it by its own resiliency, as is well known. The bell 1 has a funnel flare 3, also common, which facilitates insertion of the mating pipe 4, which save for the undercut notched keeper 5, to be more clearly hereinafter described, is simply a "plain end" pipe.

I first form an undercut hook member 6 with a diagonal rear end, shown in side view in Fig. II, providing it with the pivot hole 7.

I next form a staple 8 through the hole 7, bending it hot, making a fair fit, so that when the staple is welded in place there will be a free up and down movement of the hook on the median part of the staple but a minimum of side play, this latter being important.

Next I weld the staple 8 by both legs to the top of the bell, so that the diagonal rear end of the hook 6 is just enough forward of the largest portion of the bell 1 that when the weld is completed the hook will have a limited upward latitude of movement but cannot flop over backwards.

I next form a keeper such as shown at 5 in the drawing, consisting of a short bar of steel of rectangular section, provide it with a central notch, 5a, which notch goes about half way through the piece in cross-section, and bevel the hook seat portion 5b of the cross-section so that the greatest possible lateral deflection of the joint up or down will still afford a positive lock of this beveled portion with the undercut portion of the hook 6, designated by 6a.

It will be noted that the sides of the hook 6 are flat and rest within the notch 5a, which taken with the mounting of the hook on the staple effectively prevents twisting of the joint due to pressure if the two parts are not in alignment, which is seldom possible to do without a considerable waste of time.

When assembling or taking down the pipe line, the first act will be to insert the part 4 into the part 1. It will be immaterial which length is handled. Insert the pipe 4 into the bell 1 as far as it will go as indicated by the letter C in Fig. II, meaning contact. The outside of the parts will appear as in Fig. III.

The keeper 5 may or may not be in alignment when insertion is made, but if not, then it is turned so that the hook 6 is in alignment with the notch 5a, and the pipes are pulled a little whereupon the parts will engage securely. This is much better than having more than one hook between the bell and inserted pipe, which has been the alternative to the clevis pin heretofore, since it can be disengaged when moving the pipes as easily as engaging them, by reverse movements.

When taking the pipe apart for moving, it will first be necessary to push the parts together again as in Fig. III, whereupon a relative turning of one part with respect to the other, such as that indicated in Figs. III and IV by the keeper 5, in dotted outline in Fig. III and in full lines in Fig. IV, will allow the pipes to be taken apart almost as easily as if the rubber seal 10 were not present.

The hook and keeper are preferably placed on the top side of the pipe as shown, the top being indicated by the sprinkler connection 12, many of which will be spaced along a complete pipe line.

It will be seen at once that I have a positive lock that can be handled by one man, who ordinarily need not come nearer to it than the center of weight of a piece of pipe that he is inserting into or taking out of a pipe line, and one that will not permit "snaking" of the pipe under pressure, which is the infirmity of most single hook devices.

Having disclosed my invention so that anyone familiar with the art can make and use it, what I claim as new and desire to secure by Letters Patent, is:

1. A coupler hook and mating keeper for a slip joint pipe coupler comprising an undercut flat sided hook member hingedly mounted on the coupler in such manner that it has a limited up and down movement, and a cooperating keeper welded to the outside surface of the pipe insertable in the coupler spaced from the end thereof in such manner that it will automatically engage the hook member when placed in alignment therewith and the pipe and coupler pulled towards separation, the said keeper being characterized by a central rectangular notch part way through its section that is an easy fit for the sides of the hook and a beveled hook seat portion at the bottom of the notch.

2. A keeper for a pipe adapted to engage a mating hook on another piece of pipe comprising a block like keeper provided with a central notch having parallel sides to closely engage a mating hook, and an undercut beveled hook seat at the bottom at the terminus of the said central notch adapted to mate a similarly beveled hook member.

3. Hook and keeper locking means for automatically coupling a slip joint coupler to a mating pipe, comprising an undercut hook member hingedly mounted on one pipe member, a keeper rigidly mounted on the other pipe member in cooperative relationship when the pipe is fully inserted in the coupler, the said keeper being provided with a central notch adapted to support both sides of the hook when the parts are pulled into engagement, and an undercut hook seat beveled to match the hook in such manner that the greatest possible lateral deflection of the pipe joint will still leave the beveled parts with a tendency to pull in tighter under influence of pressure tending to separate the pipes.

ROBERT L. GHEEN.